J. Henderson,

Horseshoe.

No. 102,121. Patented Apr. 19, 1870.

Witnesses:
John A. Straight
W. C. Hayes

Inventor:
John Henderson

United States Patent Office.

JOHN HENDERSON, OF ALBION, NEW YORK.

Letters Patent No. 102,121, dated April 19, 1870.

IMPROVEMENT IN HORSESHOES.

The Schedule referred to in these Letters Patent and making part of the same.

*To all whom it may concern:*

Be it known that I, JOHN HENDERSON, of Albion, in the county of Orleans and State of New York, have invented a new and useful Improvement in Horseshoes; and I do hereby declare the following to be a clear and exact description thereof, sufficient to enable others skilled in the art to which my invention appertains to fully understand and use the same, reference being had to the accompanying drawings making a part of this specification, in which—

The nature of my invention consists in providing a horseshoe having its rear ends brought together, but not attached, and turned in toward the toe, so as to come under and support the frog, and having beveled edges on the top and outside, beveled downward and outward from the inner to the outer edge, so that a line drawn down along the exterior of the hoof at any point to the shoe would strike the beveled surface at a right angle.

I will proceed to describe my invention.

Figure 1:
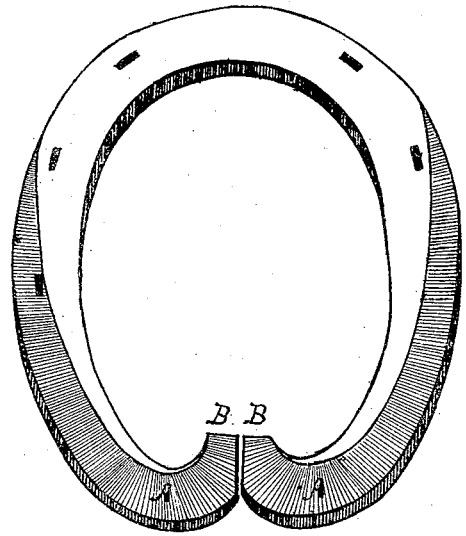
Figure 1 represents the upper side of the shoe.
Figure 2:
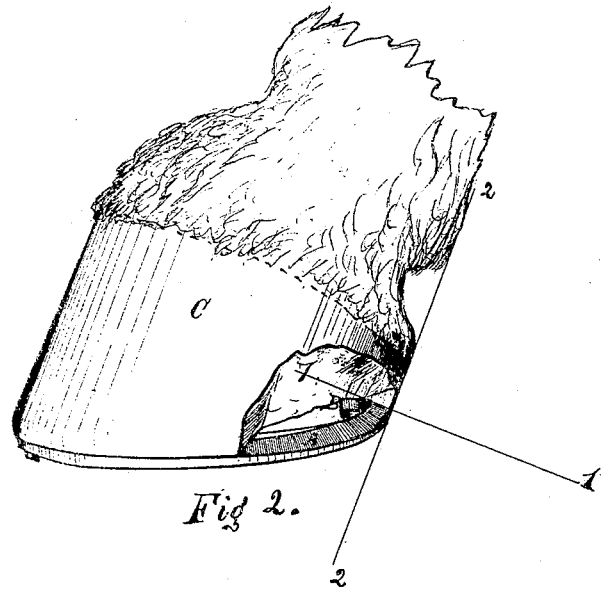
Figure 2 represents the shoe attached to the hoof, with a portion of the hoof broken away to show the relative position of the hoof and the shoe.

In fig. 1 the shoe is represented as having the portions A A beveled outward and downward at a greater or lesser angle, but always in such a plane that a line drawn through it will form a right angle with a line drawn down the outside of the hoof at a corresponding point. In fig. 2 this is shown more clearly.

C is the hoof, a portion of which is broken away.

1 1 is the line of the bevel of the shoe.

2 2 is a line drawn down the surface of the hoof.

These lines cross each other at right angles.

B B are the ends of the shoe, which are brought together, and turned in toward the toe, to support and assist the frog.

When desired, the rear calks may be produced by turning the ends B B downward.

It is well known that the frog is the most elastic portion of the horse's foot; and when this is allowed to operate as nature demands—that is, by receiving the first shock of the step—the horse steps free and natural. In the ordinary shoe, where an open space is left between its rear ends, no support is afforded to the frog, and the foot is elevated by the shoe, so that the frog does not rest on the earth.

The advantages which I claim for my shoe are, that the beveled edges A A prevent the hoof from contracting, and the ends B B afford a support for the frog, which prevents lameness, and affords greater ease to the horse. As the shock of the step is partly received by the frog, as well as by the wall of the foot, it is absolutely necessary to protect and support it.

I do not desire to claim the beveled edges A A broadly, as they are now secured to me by Letters Patent; but What I do claim as new, and desire to secure by Letters Patent, is—

As a new article of manufacture, a horseshoe having its rear ends B B brought together, but not attached, and turned in toward the toe and down to form the calks, having beveled edges A A on the top and outside, substantially as shown.

JOHN HENDERSON.

Witnesses:
V. V. BULLOCK,
L. W. BINGHAM.